United States Patent
Lyu et al.

(10) Patent No.: US 12,468,657 B2
(45) Date of Patent: Nov. 11, 2025

(54) MESSAGE FORWARDING METHOD AND APPARATUS BASED ON REMOTE DIRECT DATA STORAGE, AND NETWORK CARD AND DEVICE

(71) Applicant: HANGZHOU ALICLOUD FEITIAN INFORMATION TECHNOLOGY CO., LTD., Zhejiang (CN)

(72) Inventors: Yilong Lyu, Hangzhou (CN); Shunmin Zhu, Hangzhou (CN)

(73) Assignee: Hangzhou Alicloud Feitian Information Technology Co., LTD., Hangzhou (CN)

( * ) Notice: Subject to any disclaimer, the term of this patent is extended or adjusted under 35 U.S.C. 154(b) by 11 days.

(21) Appl. No.: 18/293,722

(22) PCT Filed: Jul. 20, 2022

(86) PCT No.: PCT/CN2022/106845
§ 371 (c)(1),
(2) Date: Jan. 30, 2024

(87) PCT Pub. No.: WO2023/005773
PCT Pub. Date: Feb. 2, 2023

(65) Prior Publication Data
US 2024/0345988 A1    Oct. 17, 2024

(30) Foreign Application Priority Data
Jul. 30, 2021   (CN) .................. 202110874970.4

(51) Int. Cl.
*H04L 69/16* (2022.01)
*G06F 15/173* (2006.01)
*H04L 69/22* (2022.01)

(52) U.S. Cl.
CPC ...... *G06F 15/17331* (2013.01); *H04L 69/161* (2013.01); *H04L 69/22* (2013.01)

(58) Field of Classification Search
CPC ... H04L 69/161; H04L 69/22; H04L 2212/00; G06F 15/17331
See application file for complete search history.

(56) References Cited

U.S. PATENT DOCUMENTS

| | | | |
|---|---|---|---|
| 2018/0026873 A1* | 1/2018 | Cheng | H04L 61/2514 709/239 |
| 2018/0046378 A1 | 2/2018 | Coburn et al. | |

(Continued)

FOREIGN PATENT DOCUMENTS

| | | |
|---|---|---|
| CN | 104426768 A | 3/2015 |
| CN | 109587112 A | 4/2019 |

(Continued)

OTHER PUBLICATIONS

Chinese Office Action for CN Application No. 202111005906.9 mailed Mar. 6, 2024, 14 pgs.

(Continued)

*Primary Examiner* — Chris Parry
*Assistant Examiner* — Steven C Nguyen
(74) *Attorney, Agent, or Firm* — Fletcher Yoder P.C.

(57) ABSTRACT

A message forwarding method and apparatus based on Remote Direct Memory Access, and a network card and a device. The method includes: acquiring payload data corresponding to an RDMA message to be forwarded; encapsulating a message header of the payload data by using a hardware module in a network card node to obtain a processed message; and forwarding the processed message by using the hardware module or a software module in the network card node.

19 Claims, 6 Drawing Sheets

(56) References Cited

U.S. PATENT DOCUMENTS

| | | | |
|---|---|---|---|
| 2019/0089641 A1* | 3/2019 | Shattah | H04L 63/1466 |
| 2020/0218668 A1 | 7/2020 | Han et al. | |
| 2022/0070095 A1* | 3/2022 | Wu | H04L 12/4633 |
| 2023/0269182 A1* | 8/2023 | Li | H04L 69/163 |
| | | | 370/392 |

FOREIGN PATENT DOCUMENTS

| | | |
|---|---|---|
| CN | 113114570 A | 7/2021 |
| CN | 113326228 A | 8/2021 |

OTHER PUBLICATIONS

International Search Report for PCT Application No. PCT/CN2022/106845 mailed Sep. 30, 2022, 3 pgs.

* cited by examiner

MESSAGE FORWARDING METHOD AND APPARATUS BASED ON REMOTE DIRECT DATA STORAGE, AND NETWORK CARD AND DEVICE

The present application is a U.S. national stage filing of International Patent Application No. PCT/CN2022/106845, filed on Jul. 20, 2022, and entitled "Message Forwarding Method and Apparatus Based on Remote Direct Data Storage, and Network Card and Device", which claims priority to Chinese patent application No. 202110874970.4, filed on Jul. 30, 2021, and entitled "Message Forwarding Method and Apparatus Based on Remote Direct Memory Access, and Network Card and Device", both of which are incorporated herein by reference in their entireties.

TECHNICAL FIELD

The present application relates to the technical field of data processing, in particular, to a message forwarding method and apparatus based on Remote Direct Memory Access, and a device.

BACKGROUND

With the development of network bandwidth and speed, there is an increasingly widespread need to migrate large amounts of data. Network bandwidth is developing at a much faster rate than the capability of computational nodes necessary to handle network traffic and the demand for memory bandwidth. The data center network architecture has gradually become a bottleneck in the development of computing and storage technologies. There is an urgent need to adopt a more efficient data communication architecture.

During data packet processing, traditional TCP/IP technology needs to go through an operating system and other software layers, which needs to occupy a large amount of server resources and memory bus bandwidths. Moreover, due to the enormous overhead of the system and the copy-move of data performed back and forth between the system memory, processor caches, and network controller caches, a heavy burden is imposed on the CPU and memory of servers. In particular, due to the severe "mismatch" between the network bandwidth, processor speed and memory bandwidth, it is more likely to exacerbate network delay effects.

SUMMARY

Embodiments of the present application provide a message forwarding method and apparatus based on Remote Direct Memory Access (RDMA), and a device, implementing a message processing operation using a combination of software and hardware, which provides an effective balance between the network performance and the flexibility of message processing, which is conducive to reducing the need for bandwidth and processor overhead, while significantly reducing latency.

In a first aspect, an embodiment of the present application provides a message forwarding method based on Remote Direct Memory Access (RDMA), including:
  acquiring payload data corresponding to an RDMA message to be forwarded;
  encapsulating a message header of the payload data by using a hardware module in a network card node to obtain a processed message;
  forwarding the processed message by using the hardware module or a software module in the network card node.

In a second aspect, an embodiment of the present application provides a message forwarding apparatus based on Remote Direct Memory Access (RDMA), including:
  a physical machine for generating payload data corresponding to an RDMA message to be forwarded;
  a hardware module, communicatively connected with the physical machine, for acquiring payload data corresponding to the RDMA message to be forwarded, and encapsulating a message header of the payload data to obtain a processed message;
  a hardware module/software module for forwarding the processed message.

In a third aspect, an embodiment of the present invention provides an electronic device, including: a memory and a processor, wherein the memory is used for storing one or more computer instructions, wherein the one or computer instructions, when executed by the processor, implement the message forwarding method based on Remote Direct Memory Access in the first aspect above.

In a fourth aspect, an embodiment of the present invention provides a computer storage medium for storing a computer program, which, when executed, enables a computer to implement the message forwarding method based on Remote Direct Memory Access in the first aspect above.

In a fifth aspect, an embodiment of the present invention provides a computer program product, including a computer readable storage medium stored with a computer instruction, which, when executed by one or more processors, enables the one or more processors to execute steps in the message forwarding method based on Remote Direct Memory Access as described in the first aspect above.

In a sixth aspect, an embodiment of the present invention provides a network card, including:
  a hardware module for acquiring payload data corresponding to an RDMA message to be forwarded, and encapsulating a message header of the payload data to obtain a processed message;
  a hardware module/software module for forwarding the processed message.

BRIEF DESCRIPTION OF THE DRAWINGS

In order to illustrate the technical solution in the embodiments of the present invention or in the existing technologies more clearly, the accompanying drawings to be used in the description of the embodiments or the existing technologies will be briefly introduced below. It is obvious that the accompanying drawings described below are some embodiments of the present invention. For those skilled in the art, other accompanying drawings may be obtained based on these drawings without involving any creative efforts.

DETAILED DESCRIPTION

Figure 1:
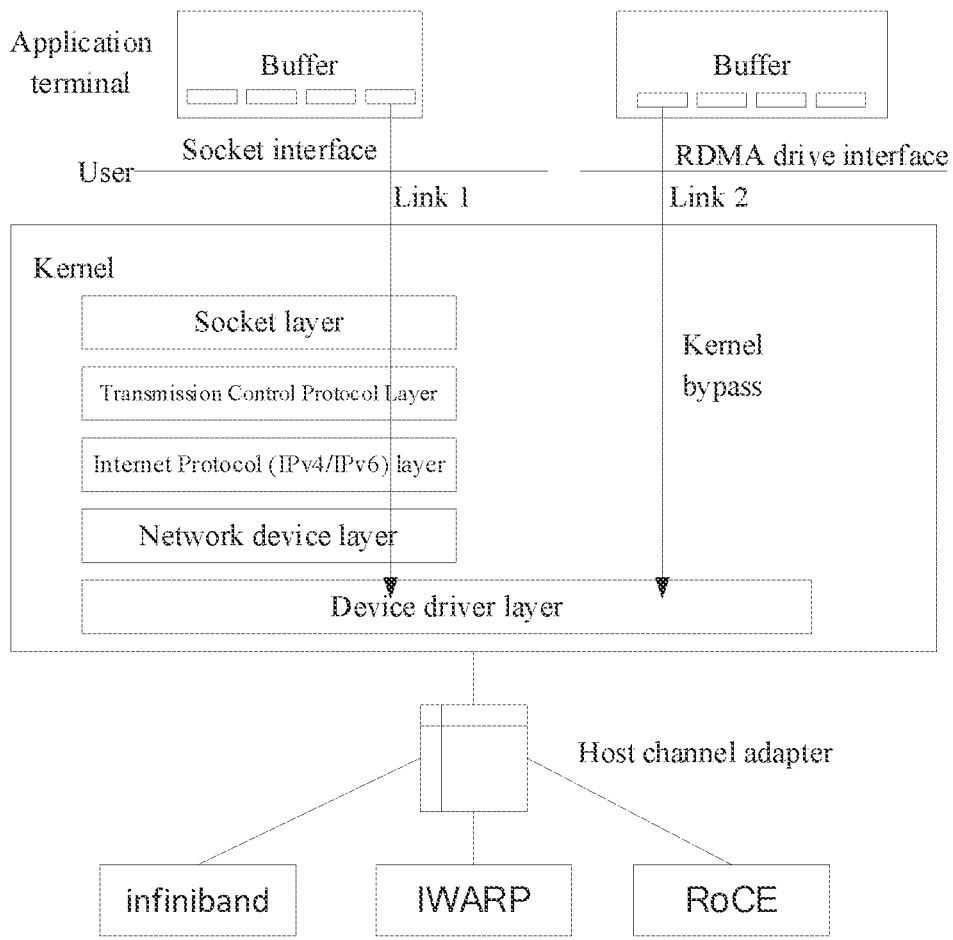
FIG. 1 is a schematic diagram of a message forwarding method provided in an embodiment in the relevant technologies.

In order to make the objects, technical solution and advantages of the embodiments of the present invention clearer, the technical solution in the embodiments of the present invention will be described clearly and completely below in conjunction with the accompanying drawings in the embodiments of the present invention. It is obvious that the described embodiments are some of the embodiments of the present invention, rather than all of them. Based on the embodiments of the present invention, all other embodiments obtained by those skilled in the art without any involving any creative efforts should fall within the scope of protection of the present invention.

The terms used in the embodiments of the present invention are only used out of the objective of describing specific embodiments, but not intended to limit the present invention. The singular forms "a", "the", and "said" used in embodiments of the present invention and the appended claims are also intended to encompass plural forms. The term "a plurality of" generally encompasses at least two, but does not preclude the inclusion of at least one unless it clearly indicates other meanings in the context.

It should be understood that the term "and/or" used herein is merely a description of an association relationship of an associated objects, indicating that three types of relationships may exist, e.g., A and/or B, which may be expressed as: A alone, both A and B, and B alone. In addition, the character "/" herein generally indicates that the preceding and subsequent associated objects are in an "or" relationship.

Depending on the context, e.g., the words "in the event that" and "if" used herein may be interpreted as "when" or "responsive to determination" or "responsive to detection". Similarly, depending on the context, the phrase "if it is determined" or "if it is detected" (a stated condition or event) may be interpreted as "when it is determined that" or "responsive to determination", or "when it is detected (a stated condition or event)" or "responsive to detection (a stated condition or event)".

It should further note that the terms "include" and "comprise" or any other variant thereof are intended to cover non-exclusive inclusion such that a commodity or system including a series of elements includes those elements, and also includes other elements not expressly listed or further includes elements that are inherent to the commodity or system. Without further limitation, an element defined by the phrase "comprising one . . . " does not exclude the circumstance where there is still another identical element in the commodity or system including the element.

In addition, the sequence of steps in the following method embodiments are only for exemplification instead of strict definition.

For easy understanding of the specific processes and effects of implementing the message forwarding methods based on Remote Direct Memory Access (RDMA, also referred to as remote direct data storage) in the embodiments, the relevant technologies will be briefly explained below:

With the development of network bandwidth and speed, there is an increasingly widespread need to migrate large amounts of data. Network bandwidth is developing at a much faster rate than the capability of computational nodes necessary to handle network traffic and the demand for memory bandwidth. The data center network architecture has gradually become a bottleneck in the development of computing and storage technologies. There is an urgent need to adopt a more efficient data communication architecture.

During data packet processing, traditional TCP/IP technology needs to go through an operating system and other software layers. As for link 1 shown in FIG. 1, a message to be processed is sent by an application terminal to a kernel, which shall pass through the socket layer (Socekets), the transmission control protocol (TCP) layer, the internet protocol (IPv4/IPv6) layer, the network device layer, and the device driver layer of the kernel. At this time, a message to be processed has quite a long transmission link, and when the message to be processed is transmitted, copying and transmission operations shall be performed on the message. The copying and transmission operations of the message are performed by a software module (CPU), which takes up a large amount of server resources and memory bus bandwidths, thereby generating large latency. Generally speaking, due to the enormous overhead of the systems and copy-move of data performed back and forth between the system memories, processor caches, and network controller caches, a heavy burden is imposed on the CPUs and memories of servers. In particular, the network latency effect is more easily aggravated in the face of severe "mismatches" between the network bandwidth, processor speed and memory bandwidth.

Remote Direct Memory Access (hereinafter referred to as RDMA) enables a computer to have direct access to the memories of other computers without the time-consuming transmission by a processor and intervention of both parties' operating systems, which allows for high-throughput and low-latency network communication, and is particularly suitable for use in a large-scale parallel computer cluster. As for link 2 shown in FIG. 1, the RDMA technology has such characteristics, namely, rapidly moving data from a system to a remote system memory without producing any effect on the operating system. By eliminating external memory copying and text swapping operations, this technology frees up bus space and CPU cycles for improved application system performance, thereby reducing the need for bandwidth and processor overhead and significantly reducing latency.

However, it is quite difficult to apply the RDMA technology in cloud networks for specific reasoning as follows: first, in cloud networks, what are used by users are virtual machines such as cloud server (Elastic Compute Service, hereinafter referred to as ECS) whose network card is generally implemented by software virtualization, and does not have the RDMA capability of a hardware network card; second, the current cloud networks are generally private networks (Virtual Private Cloud, hereinafter referred to as VPC) based on an overlay network (encapsulating a traditional network message as a payload, e.g., encapsulating the same as Vxlan), which cannot use the traditional RDMA technology; at last, due to the network virtualization in cloud networks, users' networks are not intended to be constrained by the physical network topology, while perception of traditional RDMA for physical networks is of great importance.

Figure 2:
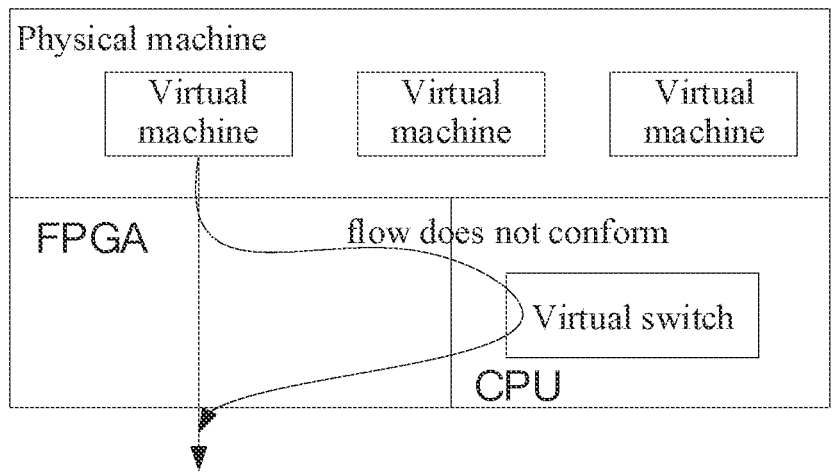
FIG. 2 is a functional block diagram of a message forwarding method based on Remote Direct Memory Access provided in an embodiment of the present invention.

In order to provide a technical solution of RDMA supported in a cloud network overlay network architecture, the embodiments provide a message forwarding method and apparatus based on Remote Direct Memory Access (RDMA), and a device. A subject that executes the message forwarding method above may be a message forwarding system which may include: a physical machine and a network card in communicative connection with the physical machine. For example, the network card can be plugged into the physical machine, and one or more virtual machines (VMs) can be started in the physical machine according to application scenarios or usage requirements. As shown in FIG. 2, the network card may include a software module (CPU) and a hardware module, wherein the software module may include a virtual switch (vswitch) responsible for the forwarding operations of normal VPC network traffic. Specifically, the software module may acquire the 5-tuple features of messages, acquire query results by inquiring various forwarding tables such as routing table and ACL table through the 5-tuple features, and then generate a second flow table on the basis of the query results and the 5-tuple features. The hardware module may use a Field Programmable Gate Array (hereinafter referred to as FPGA) or an Application Specific Integrated Circuit (hereinafter referred to as ASIC). The hardware module may uninstall a second flow table issued by the software vswitch. Specifically, when a forwarding operation is performed on a message, following steps are performed.

A physical machine/virtual machine generates a message to be forwarded which may only include payload data at this time, and sends the message to be forwarded to a network card.

A hardware module in the network card acquires the message to be forwarded sent by the physical machine/virtual machine, and encapsulates a message header of the message to be forwarded to obtain a processed message, that is, it encapsulates the message that only includes payload data as an integral message.

The hardware module/software module in the network card is used for forwarding a processed message. Specifically, it firstly detects whether the processed message conforms a first flow table pre-stored in the hardware module. In the event that the processed message conforms the first flow table, the hardware module may forward the processed message directly on the basis of the first flow table. In the event that the processed message does not conform the first flow table, the processed message is sent to a software module in the network card. The software module in the network card acquires a processed message sent by the hardware module, and forwards the processed message by using a pre-stored second flow table corresponding to the processed message. After forwarding the processed message, the software module may also send the second flow table corresponding to the processed message to the hardware module for use as a first flow table.

In the technical solution provided in the embodiments, a message processing operation is implemented in a software and hardware combination mode. Specifically, the hardware part may be responsible for the message encapsulation/decapsulation processing and the message fast forwarding operation; the software part may be responsible for a normal message forwarding operation, focusing on state management, thereby achieving an effective balance between the network performance and the flexibility of message processing, which is conducive to reducing the bandwidth and processor overhead requirements, while significantly reducing latency. In addition, the technical solution can realize application of the RDMA technology on the basis of an overlay network architecture, which can not only shield the implementation details of a physical network, and there is no restriction on the scope of the physical network, and there is no restriction on communication with subnets. In addition, the message forwarding method may multiplex the processing logic of a virtual switch with normal VPC network traffic, e.g., security groups and the like, further improving the flexibility and reliability of the use of the message forwarding method.

Some embodiments of the present invention are described in detail below in connection with the accompanying drawings. The following embodiments and the features in the embodiments may be combined with each other without conflict between the embodiments.

Figure 3:
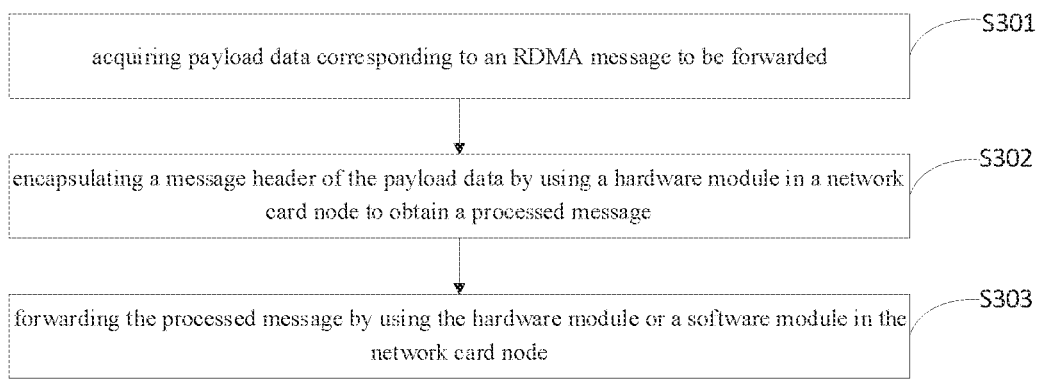
FIG. 3 is a schematic flow diagram of a message forwarding method based on Remote Direct Memory Access provided in an embodiment of the present invention.

FIG. 3 is a schematic flow diagram of a message forwarding method based on Remote Direct Memory Access provided in an embodiment of the present invention. With reference to FIG. 3, the embodiment provides a message forwarding method based on Remote Direct Memory Access (RDMA). A subject that executes the method is a message forwarding apparatus based on Remote Direct Memory Access. It can be understood that the message forwarding apparatus may be implemented as software or a combination of software and hardware. In specific implementation, the message forwarding apparatus can be implemented as a network card node. Specifically, the message forwarding method based on Remote Direct Memory Access may include following steps.

Step S301: acquiring payload data corresponding to an RDMA message to be forwarded.

Step S302: encapsulating a message header of the payload data by using a hardware module in a network card node to obtain a processed message.

Step S303: forwarding the processed message by using the hardware module or a software module in the network card node.

The specific processes and effects of implementing respective steps above are described in detailed below.

Step S301: acquiring payload data corresponding to an RDMA message to be forwarded.

When having requirements for data access, a user may generate an RDMA message to be forwarded through a physical machine or virtual machine. The RDMA message to be forwarded generated at this time only includes payload data. Specifically, the physical machine may provide an interface or a port for the user to input an execution operation, through the interface or the port, the execution operation input by the user may be obtained, and through the execution operation, an RDMA message to be forwarded may be generated. It can be understood that in different application scenarios, RDMA messages to be forwarded as generated may correspond to different functions and effects, e.g., a RDMA message to be forwarded for implementing a data access operation, a RDMA message to be forwarded for implementing a control operation, a RDMA message to be forwarded for implementing a response operation, etc.

After generating a message to be forwarded, the physical machine or virtual machine may send the message to be forwarded to a network card node. It can be understood that the number of the messages to be forwarded that may be acquired by the network card node may be one or more. In specific implementation, the physical machine or virtual machine is configured with a drive module for a transmission operation of RDMA data, and the message to be forwarded may be sent to the network card node through the physical machine or virtual machine such that the network card node may acquire payload data corresponding to the RDMA message to be forwarded.

Step 302: encapsulating the message header of the payload data by using a hardware module in the network card node to obtain a processed message.

The network card node may include a hardware module and a software module. The hardware module is used for implementing the message encapsulation/decapsulation processing and the message fast forwarding operation. The software module is used for implementing a normal message forwarding operation and a state management operation of the messages. The hardware module above may be implemented by using FPGA or ASIC, and the software module may be implemented by CPU. After the network card node acquires payload data, for enabling the message forwarding method to be applicable in an overlay network architecture, the hardware module in the network card node may be used for encapsulating the message header of the payload data. The message header of the payload data may include: transmission control protocol (TCP) header information, internet protocol (IP) header information, and media access control (MAC) header information. so that an integral processed message may be acquired, which may be transmitted in the overlay network architecture.

Step S303: forwarding the processed message by using the hardware module or a software module in the network card node.

After a processed message is acquired, the processed message may be forwarded by using a hardware module or software module in the network card node. In some embodiments, forwarding a processed message by using a hardware module or software module in the network card node may include: detecting whether the processed message conforms a first flow table, wherein the first flow table is stored in the hardware module; in the event that the processed message conforms the first flow table, the processed message is forwarded by using the hardware module and the first flow table; in the event that the processed message does not conform the first flow table, the processed message is forwarded by using the software module and a second flow table, wherein the second flow table is stored in the software module.

For a network card node, the hardware module is pre-stored with a first flow table for implementing a rapid traffic forwarding operation, and the software module is pre-stored with a second flow table for implementing a traffic forwarding operation. After the hardware module acquires the processed message, the processed message may be analyzed and detected, so that it may be detected whether the processed message conforms a first flow table. Specifically, detecting whether a processed message conforms the first flow table may include: determining 5-tuple information (source IP address, destination IP address, protocol number, source port, and destination port) corresponding to the processed message, and information regarding execution operations, and detecting whether the processed message conforms the first flow table on the basis of the 5-tuple and the execution operations; determining that the processed message conforms the first flow table in the event that the first flow table includes the 5-tuple and the execution operations corresponding to the processed message; determining that the processed message does not conform the first flow table in the event that the first flow table does not include the 5-tuple and the execution operations corresponding to the processed message.

When the processed message conforms the first flow table, this indicates that the hardware module can perform a direct forwarding operation of the processed message, and it is thus possible to perform a forwarding operation on the processed message by directly using the hardware module and the first flow table, which is conducive to improving the quality and efficiency of performing a forwarding operation of the processed message. When the processed message does not conform the first flow table, this indicates that the hardware module cannot perform a direct forwarding operation of the processed message, and it is thus possible to perform a forwarding operation of the processed message by using the software module in the network card node and the second flow table stored in the software module, which effectively implements a normal forwarding operation of the processed message.

In yet further embodiments, in order to improve the practicability of the method, after a processed message is forwarded by using a software module in a network card node and a second flow table, the method in the embodiments may further include: acquiring a target table corresponding to the processed message; sending the target flow table to a hardware module for use as a first flow table.

Specifically, after the software module in the network card node and the second flow table are used to forward the processed message, as the hardware module does not include a first flow table corresponding to the processed message at this time, in order to improve the quality and efficiency of performing a forwarding operation of the subsequent message to be processed, the software module may acquire a target flow table corresponding to the processed message, and then send the target flow table to the hardware module for use as a first flow table, thereby effectively implementing a continuous updating operation of the first flow table.

For example, a network card node in a region may acquire a user A's message to be processed and a user B's message to be processed. At this time, in the network card node, a software module includes a second flow table corresponding to user A and user B above, and a hardware module includes a first flow table corresponding to user A and user B above. When the network card node receives a user C's message to be processed for the first time, the hardware module in the network card node does not include a first flow table corresponding to user C, the software module in the network card node is thus used to forward the user C's message to be processed. After processing is completed, a target flow table corresponding to the user C's message to be processed may be acquired, and then the target flow table is sent to the hardware module to be used as a first flow table. At this time, the first flow table included in the hardware module includes: a first flow table corresponding to user A, and a first flow table corresponding to user B, and a fast-forwarding process corresponding to user C.

In this way, later, when the message to be processed corresponding to user C is acquired, the message to be processed may be forwarded by directly using the hardware module in the network card node, which is conducive to improving the quality and efficiency of the message forwarding operation and reducing the message forwarding delay.

The message forwarding method based on Remote Direct Memory Access provided in the embodiment obtains a processed message by acquiring the payload data corresponding to a RDMA message to be forwarded and encapsulating a message header of payload data by using a hardware module in the network card node, and then detects whether the processed message conforms a first flow table, forwards the processed message by using the hardware module and the first flow table in the event that the processed message conforms the first flow table, and forwards the processed message by using the software module in the network card node and the second flow table in the event that the processed message does not conform the first flow table, which effectively implements a message processing operation in a software and hardware combination mode. Specifically, the hardware part may be responsible for the message encapsulation/decapsulation processing and the message fast forwarding operation; the software part may be responsible for a normal message forwarding operation, focusing on state management, thereby achieving an effective balance between the network performance and the flexibility of message processing, which is conducive to reducing the bandwidth and processor overhead requirements, while significantly reducing latency. In addition, the technical solution can realize application of the RDMA technology on the basis of an overlay network architecture, which can not only shield the implementation details of a physical network, and there is no restriction on the scope of the physical network, and there is no restriction on communication with subnets. In addition, the message forwarding method may multiplex the processing logic of a virtual switch with normal VPC network traffic, e.g., security groups and the like, further improving the flexibility and reliability of the use of the message forwarding method.

Figure 4:
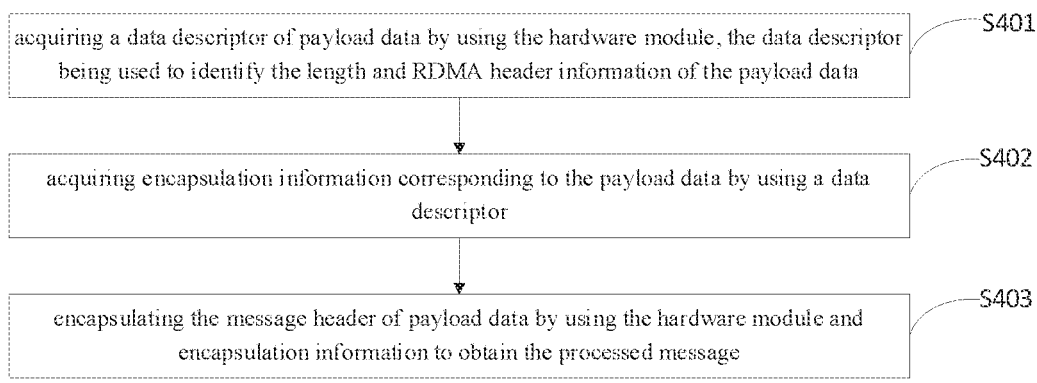
FIG. 4 is a schematic flow diagram of encapsulating a message header of the payload data by using a hardware module in the network card node to obtain a processed message provided in an embodiment of the present inven

FIG. 4 is a schematic flow diagram of encapsulating a message header of the payload data by using a hardware module in the network card node to obtain a processed message provided in an embodiment of the present invention. With reference to FIG. 4, the embodiment provides a mode of implementing encapsulation of the message header of payload data to acquire a processed message. Specifically, in the embodiment, encapsulating the message header of the payload data by using the hardware module in the network card node to obtain the processed message includes following steps.

Step S401: acquiring a data descriptor of payload data by using the hardware module, the data descriptor being used to identify the length and RDMA header information of the payload data.

As for the payload data, the data length is generally long. For example, payload data includes 1,500 bytes. At this time, large amounts of resources shall be occupied for processing the payload data. In order to decrease the resources occupied by data processing, after the hardware module acquires the payload data, the payload data may be analyzed to acquire a data descriptor for identifying the length of the payload data and RDMA header information. The RDMA header information above may include: direct data placement (hereinafter referred to as DDP) information and marker-based, protocol data unit aligned (hereinafter referred to as MPA) header information.

Step S402: acquiring encapsulation information corresponding to the payload data by using a data descriptor.

After a data descriptor is acquired, encapsulation information corresponding to payload data is acquired by using the data descriptor. In some embodiments, encapsulation information is stored in a software module. At this time, acquiring encapsulation information corresponding to payload data by using the data descriptor may include: sending the data descriptor to a software module by using the hardware module; generating encapsulation information corresponding to payload data by using the software module and the data descriptor, and sending the encapsulation information and the data descriptor to the hardware module.

Since the encapsulation information is stored in the software module, in order to acquire the encapsulation information, a data descriptor may be sent to the software module by using the hardware module. After the software receives the data descriptor, encapsulation information corresponding to payload data may be generated by using the data descriptor. The encapsulation information may include: data serial number, TCP encapsulation information and so forth. Specifically, generating the encapsulation information corresponding to payload data by using the software module and a data descriptor may include: performing protocol stack processing and congestion control processing on the data descriptor by using the software module to generate encapsulation information corresponding to the payload data, wherein the encapsulation information comprises: a congestion control value for identifying congestion control, Transmission Control Protocol TCP header information, Internet Protocol IP header information, and Medium Access Control MAC header information.

After the software module acquires the encapsulation information, the encapsulation information and a data descriptor corresponding to the encapsulation information may be sent to the hardware module, such that the hardware module may accurately and effectively acquire encapsulation information corresponding to payload data. As a matter of course, those skilled in the art could also acquire encapsulation information corresponding to payload data in other ways as long as it can be guaranteed that the hardware module can accurately acquire the encapsulation information. No more details will be repeated here.

Step S403: encapsulating the message header of payload data by using the hardware module and encapsulation information to obtain the processed message.

After the encapsulation information is acquired, the message header of payload data may be encapsulated by using the hardware module and the encapsulation information. Specifically, the hardware module may perform encapsulation operations on the TCP header information, IP header information, and MAC header information of payload data by using the encapsulation information to obtain an integral processed message.

In the embodiment, a data descriptor of payload data is acquired by using the hardware module, encapsulation information corresponding to the payload data is acquired by using the date descriptor, and then the message header of the payload data is encapsulated by using the hardware module and the encapsulation information to obtain a processed message, which decreases the data processing resources required for encapsulation operations, and is conducive to reducing the data processing delay and further improving the quality and efficiency of the message forwarding operation on the basis of ensuring that the message header of the payload data is accurately and effectively encapsulated.

Figure 5:
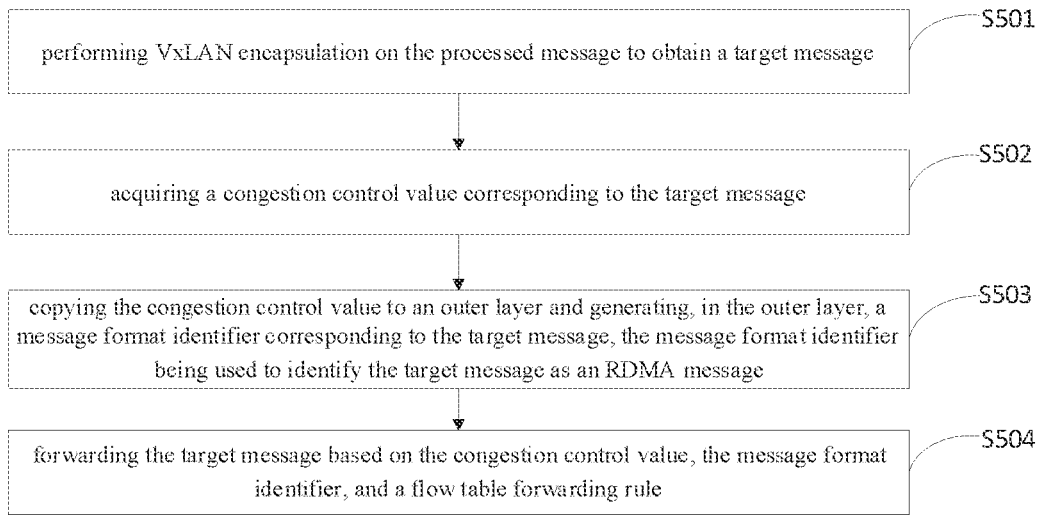
- FIG. 5 is a schematic flow diagram of forwarding the processed message provided in an embodiment of the present invention.

FIG. 5 is a schematic flow diagram of forwarding the processed message provided in an embodiment of the present invention. With reference to FIG. 5, in the embodiment above, the embodiment provides a mode of implementing a forwarding operation of a processed message regardless of forwarding the processed message by using a hardware module and a first flow table or forwarding the processed message by using a software module in the network card node and a second flow table. Specifically, forwarding the processed message in the embodiment may include following steps.

Step S501: performing VxLAN encapsulation on the processed message to obtain a target message.

Step S502: acquiring a congestion control value corresponding to the target message.

Step S503: copying the congestion control value to an outer layer and generating, in the outer layer, a message format identifier corresponding to the target message, the message format identifier being used to identify the target message as an RDMA message.

Step S504: forwarding the target message based on the congestion control value, the message format identifier, and a flow table forwarding rule.

When a forwarding operation is performed on the processed message, in order to ensure stable reliability of the message forwarding operation, VxLAN encapsulation may be first performed on the processed message to obtain a target message. After the target message is acquired, a congestion control value corresponding to the target message may be acquired. Specifically, acquiring the congestion control value corresponding to the target message may include: analyzing the processed message to determine the congestion control value corresponding to the processed message, and determining the congestion control value corresponding to the processed message as a congestion control value corresponding to the target message with the congestion control value used for identifying the network transmission rate at which the forwarding operation is performed on the target message.

Since the determined congestion control value is present in the inner layer of a network, the client cannot perceive the obtained congestion control value, and thus cannot control forwarding of a target message on the basis of the congestion control value, after the congestion control value is acquired, the congestion control value may be therefore copied to an outer layer, and a message format identifier corresponding to the target message is generated on the outer layer with the message format identifier used for identifying the target message as an RDMA message. When the outer layer has a corresponding congestion control value and message format identification, a forwarding operation may be performed directly on the target message on the basis of the congestion control value, the message format identifier, and the flow table forwarding rule, thereby ensuring the stable reliability of the forwarding operation of the target message.

Specifically, the implementation mode above may be applied in the following two scenarios.

(1) When the processed message conforms a first flow table, the hardware module may perform VxLAN encapsulation on the processed message on the basis of a rule in the first flow table to obtain a target message; then acquire a congestion control value corresponding to the target message; copy the congestion control value to the outer layer, generate a message format identification corresponding to the target message on the outer layer, and then forward the target message on the basis of the congestion control value, the message format identification, and the rule in the first flow table.

(2) When the processed message does not conform the first flow table, the hardware module may send the processed message to the virtual switch (vswitch) in the software module for processing. The vswitch may perform VxLAN encapsulation on the processed message to obtain a target message, and then acquire a congestion control value corresponding to the target message, copy the congestion control value to the outer layer, generate a message format identifier corresponding to the target message on the outer layer, forward the target message on the basis of the congestion control value, the message format identifier, and a rule in a second flow table, and then forward the message. At this time, the software module may also send the second flow table corresponding to the target message to a target module for use as a first flow table.

In the embodiment, by performing VxLAN encapsulation on the processed message, a target message is obtained, a congestion control value corresponding to the target message is acquired, the congestion control value is then copied to an outer layer, a message format identifier corresponding to the target message is generated on the outer layer, and the target message is forwarded on the basis of the congestion control value, the message format identifier, and the flow table forwarding rule, which effectively implements a stable and effective forwarding operation of the target message, and further improves the safe reliability of using the message forwarding method.

Figure 6:
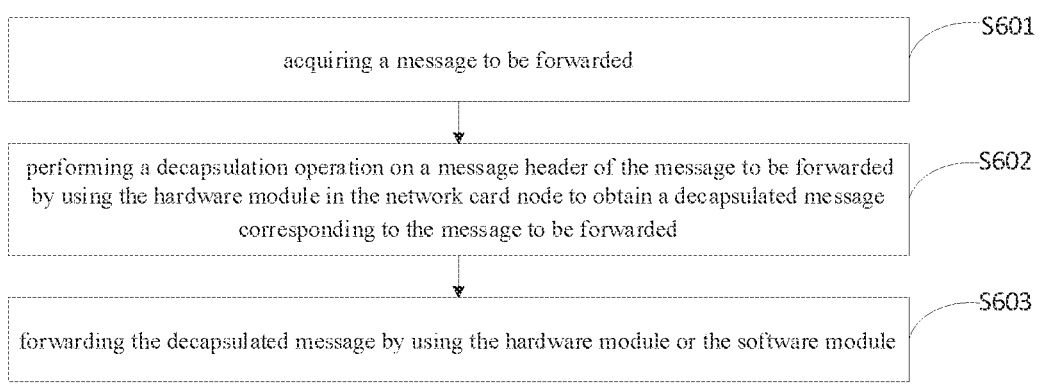
FIG. 6 is a schematic flow diagram of another message forwarding method based on Remote Direct Memory Access provided in an embodiment of the present invention.

FIG. 6 is a schematic flow diagram of another message forwarding method based on Remote Direct Memory Access provided in the embodiment of the present invention. With reference to FIG. 6, the method in the embodiment may further include following steps.

Step S601: acquiring a message to be forwarded.

When the message forwarding apparatus is applied in a receiving end, the message forwarding apparatus may receive a message to be forwarded to a destination end. The message to be forwarded at this time may include: payload data, a congestion control value, transmission control protocol (TCP) header information, internet protocol (IP) header information, media access control (MAC) header information, and so forth.

Step S602: performing a decapsulation operation on a message header of the message to be forwarded by using the hardware module in the network card node to obtain a decapsulated message corresponding to the message to be forwarded.

After the network card node acquires the message to be forwarded, in order to ensure the quality and efficiency of transmitting the message to be forwarded, a decapsulation operation of the message header on the message to be forwarded may be performed by using a hardware module in the network card node, which may specifically include performing a decapsulation operation on transmission control protocol (TCP) header information, internet protocol (IP) header information, media access control (MAC) header information, and so forth such that a decapsulated message corresponding to the message to be forwarded may be obtained.

Step S603: forwarding the decapsulated message by using the hardware module or the software module.

After the decapsulated message is acquired, the decapsulated message may be forwarded by using a hardware module or software module included in the network card node. In some embodiments, forwarding the decapsulated message by using the hardware module or the software module may include: detecting whether the decapsulated message conforms a first flow table; forwarding the decapsulated message by using the hardware module and the first flow table in the event that the decapsulated message conforms the first flow table; forwarding the decapsulated message by using the software module and a second flow table in the event that the decapsulated message does not conform the first flow table.

Specifically, after the decapsulated message is acquired, the decapsulated message may be analyzed to detect whether the decapsulated message conforms a first flow table. The mode of implementation and effects realized in the steps of the embodiment are similar to that of Step S303 in the embodiment above. Reference can be made to the contents stated above. No more details will be repeated here.

When the decapsulated message conforms the first flow table, this indicates that a hardware module may perform a direct forwarding operation on the decapsulated message, it is thus possible to perform a forwarding operation on the decapsulated message by directly using the hardware module and the first flow table, which is conducive to improving the quality and efficiency of performing a forwarding operation of the decapsulated message. In some embodiments, forwarding a message to be forwarded by using a hardware module and a first flow table may include: performing VxLAN decapsulation on the decapsulated message by using the hardware module and the first flow table to obtain a target message; acquiring a congestion control value corresponding to the target message, and copying the congestion control value to an inner layer; and forwarding the target message based on the congestion control value and the first flow table.

Specifically, when a forwarding operation is performed on the decapsulated message, because the decapsulated message is a message after the VxLAN encapsulation operation is performed, at this time, in order to ensure the stable reliability of the message forwarding operation, VxLAN decapsulation may be performed first on the decapsulated message to obtain a target message. After the target message is acquired, a congestion control value corresponding to the target message may be acquired. Specifically, acquiring a congestion control value corresponding to the target message may include: analyzing the decapsulated message to determine a congestion control value corresponding to the decapsulated message, and determining the congestion control value corresponding to the decapsulated message as the congestion control value corresponding to the target message with the congestion control value used for identifying the network transmission rate at which a forwarding operation is performed on the target message.

Since the determined congestion control value is located on the outer layer, forwarding of the target message cannot be controlled directly on the basis of the congestion control value, after a congestion control value is acquired, the congestion control value may be therefore copied to the inner layer, and then a forwarding operation may be performed directly on the target message on the basis of the congestion control value and a forwarding rule in a first flow table. That is, a target message is sent to the destination end, thereby ensuring the stable reliability of a forwarding operation of the target message.

In some further embodiments, after a target message is obtained, the methods in the embodiments may further include: generating and storing a data sequence value corresponding to the target message, the data sequence value being related to encapsulation information for performing encapsulation processing on message data.

When a message is forwarded, if the received message only includes payload data, in order to realize a normal forwarding operation on the message, an encapsulation operation shall be performed on the message. At this time, an encapsulation operation of the message may be performed by using encapsulation information included in the software module. The encapsulation information above includes a data sequence value. For ensuring that different messages may correspond to different data sequence values, after obtaining a target message, the software module will generate and store a data sequence value corresponding to the target message. It can be understood that different target messages may generate different data sequence values. For example, the target messages include: message 1, message 2, and message 3. When the message 1 is generated, a software module will generate and store sequence 1 corresponding to the message 1. For example, the sequence 1 may be 202107150032. When the message 2 is generated, the software module will generate and store sequence 2 corresponding to the message 2. For example, the sequence 2 may be 202107150033. When the message 3 is generated, the software module will generate and store sequence 3 corresponding to the message 3. For example, the sequence 3 may be 202107150033. A data sequence value corresponding to a target message is generated and stored, and the stored data sequence value is related to encapsulation information for performing encapsulation processing on message data, the stable reliability of an encapsulation operation of a message may be then ensured.

In addition, when the decapsulated message does not conform a first flow table, this indicates that the hardware module cannot perform a direct forwarding operation on the decapsulated message, and thus a forwarding operation on the decapsulated message may be performed by using the software module in the network card node and a second flow table stored in the software module, so that a normal forwarding operation on the decapsulated message is effectively implemented.

In some embodiments, forwarding a decapsulated message by using a software module and a second flow table may include: acquiring a message format identifier corresponding to the decapsulated message by using the software module and the second flow table; performing VxLAN decapsulation on the decapsulated message based on the second flow table to obtain a target message, in the event that the decapsulated message is determined as an RDMA message based on the message format identifier; acquiring a congestion control value corresponding to the target message and copying the congestion control value to an inner layer; forwarding the target message based on the congestion control value and the second flow table.

When receiving am RDMA message, the software module can perform a normal forwarding operation on the RDMA message on the basis of a second flow table included in the software module, but cannot perform a normal forwarding operation on a non-RDMA message. After a decapsulated message is acquired, the message type corresponding to the decapsulated message may be therefore identified first. Specifically, a message format identifier corresponding to the decapsulated message may be acquired by using the software module and the second flow table. When the message format identifier is an identifier for identifying an RDMA message, the decapsulated message may be determined as an RDMA message. Otherwise, the decapsulated message may be determined as a non-RDMA message.

The decapsulated message is determined as an RDMA message on the basis of the message format identification, this indicates that the software module may perform a normal message forwarding operation on the decapsulated message. At this time, in order to ensure the stable reliability of the message forwarding operation, VxLAN decapsulation may be performed first on the decapsulated message to obtain a target message. After the target message is acquired, a congestion control value corresponding to the target message may be acquired. Specifically, acquiring a congestion control value corresponding to the target message may include: analyzing the decapsulated message to determine a congestion control value corresponding to the decapsulated message, and determining the congestion control value corresponding to the decapsulated message as the congestion control value corresponding to the target message with the congestion control value used for identifying the network transmission rate at which a forwarding operation is performed on the target message.

Since the determined congestion control value is located on the outer layer, forwarding of the target message cannot be controlled directly on the basis of the congestion control value, after a congestion control value is acquired, the congestion control value may be then copied to the inner layer, and then a forwarding operation may be performed directly on the target message on the basis of the congestion control value and a forwarding rule in second first flow table. That is, a target message is sent to the destination end, thereby ensuring the stable reliability of a forwarding operation of the target message.

In the embodiment, a decapsulated message corresponding to the message to be forwarded is obtained by acquiring the message to be forwarded and performing a decapsulation operation on a message header of the message to be forwarded by using a hardware module in a network card node, and detect whether the decapsulated message conforms a first flow table. When the decapsulated message conforms the first flow table, the decapsulated message is forwarded by using the hardware module and the first flow table. When the decapsulated message does not conform the first flow table, the decapsulated message is forwarded by using the software module and the second flow table. This effectively implements a forwarding operation on a message to be forwarded which is received by a receiving terminal and sent to a destination terminal in a software and hardware combination mode, thereby further improving the practicality and scope of application of the message forwarding method.

Figure 7:
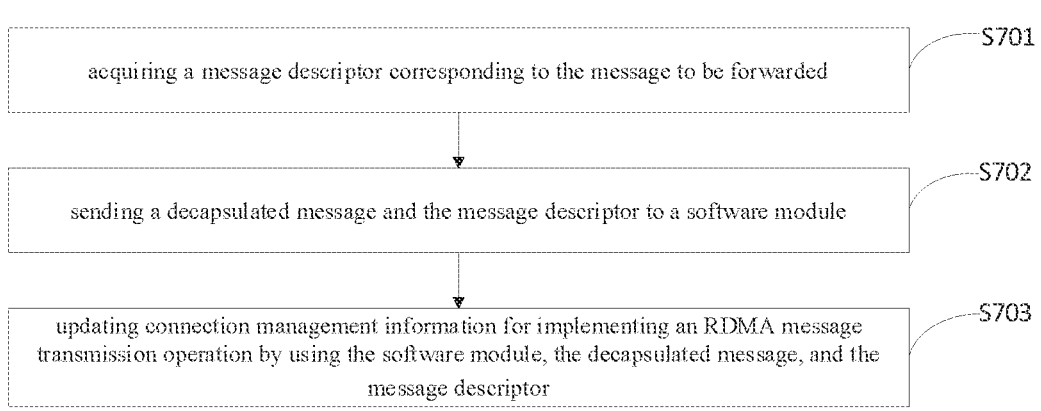
FIG. 7 is a schematic flow diagram of another message forwarding method based on Remote Direct Memory Access provided in an embodiment of the present invention.

FIG. 7 is a schematic flow diagram of another message forwarding method based on Remote Direct Memory Access provided in an embodiment of the present invention. With reference to FIG. 7, after a decapsulation operation is performed on the message header of a message to be forwarded by using a hardware module in the network card node, the method in the embodiment may further include following steps.

Step S701: acquiring a message descriptor corresponding to the message to be forwarded.

Step S702: sending a decapsulated message and the message descriptor to a software module.

Step S703: updating connection management information for implementing an RDMA message transmission operation by using the software module, the decapsulated message, and the message descriptor.

The software module is stored with connection management information for implementing an RDMA message transmission operation. The connection management information includes a data sequence value, a serial number, and so forth. The connection management information is used for controlling all message forwarding operations. In order to realize stable and effective control of a message forwarding operation on the basis of the connection management information, after a decapsulation operation of the message header of a message to be forwarded is performed by using a hardware module in the network card node, that is, after the ip header, the mac header, and the TCP header are decapsulated from the message to be forwarded, the hardware module may analyze the message to be forwarded to obtain a message descriptor corresponding to the message to be forwarded. The message descriptor is used for identifying the information regarding the length and RDMA header information of a message to be forwarded. After the decapsulated message and the message descriptor are acquired, the decapsulated message and the message descriptor may be sent to a software module. After acquiring the decapsulated message and the message descriptor, the software module may update connection management information for implementing an RDMA message transmission operation on the basis of the decapsulated message and the message descriptor, and thus may obtain the updated management information, and then may manage and control the subsequent message forwarding operation by using the updated management information, thereby effectively ensuring the stable reliability of the message forwarding operation.

Figure 8:
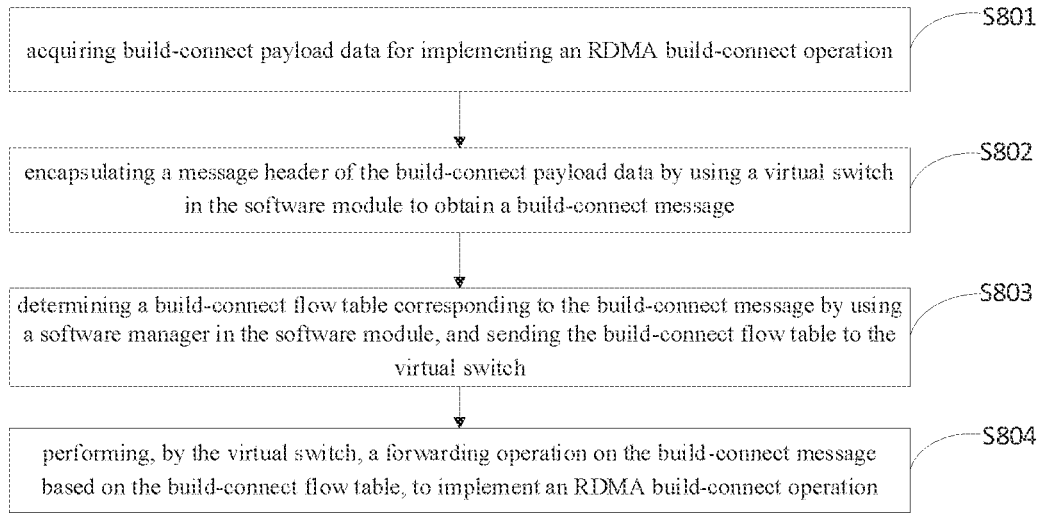
FIG. 8 is a schematic flow diagram of yet another message forwarding method based on Remote Direct Memory Access provided in an embodiment of the present invention.

FIG. 8 is a schematic flow diagram of a further message forwarding method based on Remote Direct Memory Access provided in an embodiment of the present invention. On the basis of any of the embodiments above, with reference to FIG. 8, the embodiment provides a build-connect process connection establishing process for implementing an RDMA data transmission operation. Specifically, before acquiring payload data corresponding to an RDMA message to be forwarded, the method in the embodiment may further include following steps.

Step S801: acquiring build-connect payload data for implementing an RDMA build-connect operation.

Step S802: encapsulating a message header of the build-connect payload data by using a virtual switch in the software module to obtain a build-connect message.

Step S803: determining a build-connect flow table corresponding to the build-connect message by using a software manager in the software module, and sending the build-connect flow table to the virtual switch.

Step S804: performing, by the virtual switch, a forwarding operation on the build-connect message based on the build-connect flow table, to implement an RDMA build-connect operation.

Build-connect payload data for implementing an RDMA build-connect operation may be sent by a host or a virtual switch to a message forwarding apparatus based on Remote Direct Memory Access. At this time, there is no first flow table corresponding to the build-connect payload data in the hardware module of the network card node. After the build-connect payload data for implementing a RDMA build-connect operation is acquired in the network card node, the message header of the build-connect payload data may be encapsulated by using a virtual switch in the software module. Specifically, the build-connect payload message may be encapsulated in the Vxlan header, and thus the build-connect message may be obtained.

After the build-connect message is acquired, a build-connect flow table corresponding to the build-connect message may be generated and determined by using the software manager in the software module. After the build-connect flow table is generated and determined, in order to implement a forwarding operation of the build-connect message, the build-connect flow table may be sent to a virtual switch such that the virtual switch acquires the build-connect flow table stably. After acquiring the build-connect flow table, the virtual switch may forward the build-connect message on the basis of the build-connect flow table to implement an RDMA build-connect operation.

In yet further embodiments, after the virtual switch forwards a build-connect message on the basis of a build-connect flow table, the method in the embodiment may further include: sending the build-connect flow table to a hardware module by using a virtual switch to be used as a first flow table.

Specifically, after the virtual switch forwards a build-connect message on the basis of a build-connect flow table, because the hardware module does not include a build-connect flow table corresponding to the build-connect message at this time, in order to improve the quality and efficiency of a forwarding operation on the subsequent build-connect message, the software module may acquire a build-connect flow table corresponding to the build-connect message, and then send the build-connect flow table to the hardware module to be used as a first flow table by using the virtual switch in the software module, thereby effectively implementing a continuous update operation of the first flow table.

In the embodiment, a build-connect message is obtained by acquiring the build-connect payload data for implementing an RDMA build-connect operation and then encapsulating the message header of the build-connect payload data by using the virtual switch in the software module; a build-connect flow table corresponding to the build-connect message is determined by using the software manager in the software module, the build-connect flow table is sent to a virtual switch, and then the build-connect message is forwarded on the basis of the build-connect flow table by using the virtual switch, which effectively implements an RDMA build-connect operation, thereby further improving the stable reliability of operating the message forwarding method.

Figure 9:
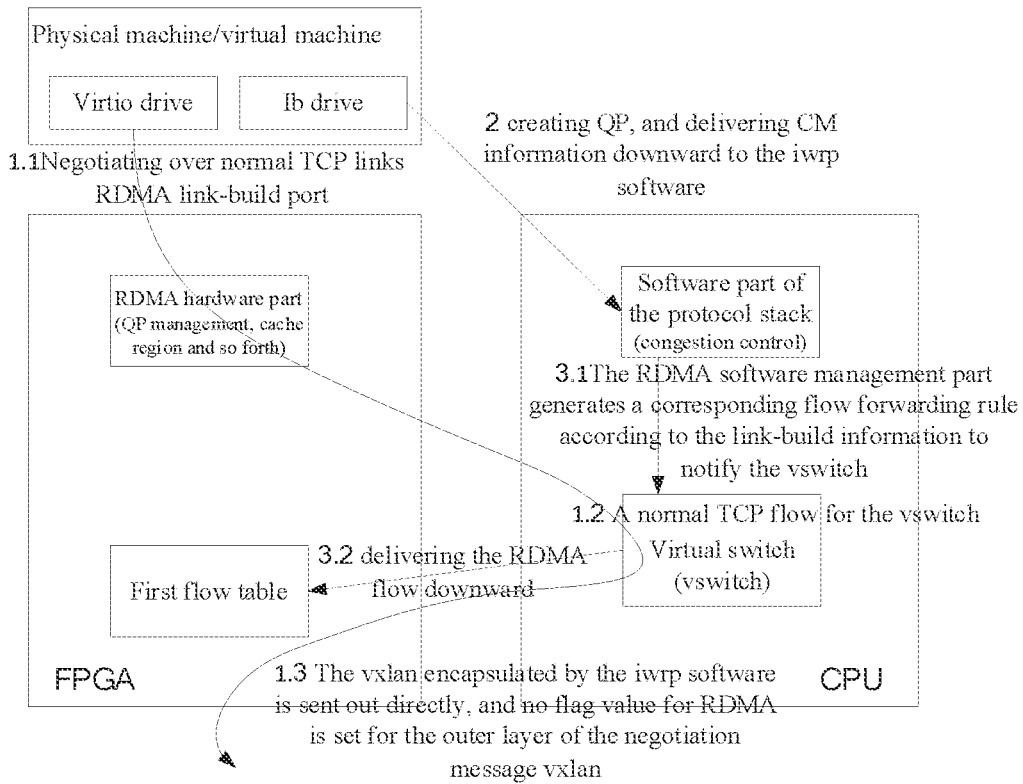
FIG. 9 is a schematic diagram of a build-connect process based on Remote Direct Memory Access provided in an application embodiment of the present invention.
Figure 10:
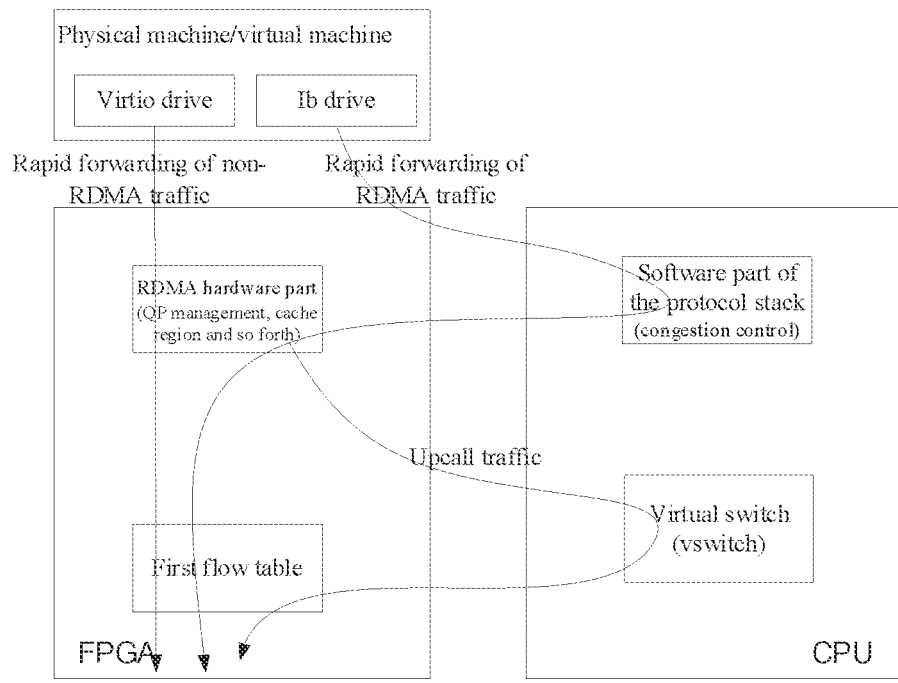
FIG. 10 is a schematic diagram of a data transmission process based on Remote Direct Memory Access provided in an application embodiment of the present invention.

In specific application, with reference to FIG. 9-FIG. 10, the application embodiment provides an RDMA build-connect process on the basis of the iwarp VPC network architecture and a data transmission process on the basis of the iwarp VPC network architecture. The iwarp (Internet Wide Area RDMA Protocol) above is a protection protocol for Remote Direct Memory Access and remote direct data placement, and is implemented on the basis of the TCP protocol. For implementing the RDMA build-connect process, with reference to FIG. 9, a QP interface for implementing a RDMA transmission operation is provided on a physical machine (host) or a virtual machine (VM), and RDMA build-connect information may be delivered downward to a network card node by invoking the QP interface above or an ib drive. At this point, RDMA build-connect information may be captured by a software module in the network card node. Specifically, the RDMA build-connect process on the basis of the iwarp VPC network architecture may include the following steps.

Step 1.1: A physical machine/virtual machine may generate an RDMA build-connect message, and send the RDMA build-connect message to a network card node, The iwarp RDMA connection between the physical machine and the network card node may be established by means of three normal TCP handshakes. The same as normal network traffic, the RDMA build-connect message may be sent out from the virtio-net drive (a para virtualized drive). Because there is no corresponding first flow table in FPGA in the network card node at this time, the RDMA build-connect message may be uploaded to a virtual switch (vswitch) in the network card node for processing.

Step 1.2: After acquiring the RDMA build-connect message, the virtual switch (vswitch) may be forwarded according to normal traffic.

Step 1.3: The vswitch first sends out the RDMA build-connect message with encapsulation of vxlan header.

Step 2: The software part of the protocol stack in the network card node creates a corresponding flow forwarding rule (i.e., a second flow table) according to the build-connect message, and may deliver the flow forwarding rule (i.e., a second flow table) to the vswitch, such that the vswitch may acquire the second flow table.

Step 2.1: The vswitch may perform a forwarding operation on the build-connect message on the basis of the second flow table to implement the RDMA build-connect operation.

Step 2.2: The vswitch can further deliver a second flow table downward to FGPA in the network card node to generate a first flow table.

With reference to FIG. 10, the data transmission process on the basis of the iwarp VPC network architecture may include the following steps.

Step 101: A physical machine or virtual machine may generate an RDMA transmitted message which includes payload data.

The RDMA transmitted message for implementing an RDMA transmission operation is sent out from an ib drive device. The RDMA transmitted message only has payload data at this time.

Step 102: an RDMA transmitted message is acquired in the network card node; the hardware module may deliver the descriptor of payload data to the software part of the protocol stack; the software part of the protocol stack generates a TCP header, an ip header and a mac header encapsulated as required by the payload data through stack protocol processing and congestion control.

Step 103: The software part of the protocol stack delivers the TCP header, the ip header, and the mac header encapsulated as required for generating payload data together with the descriptor of the payload data back to an RDMA hardware part of the hardware FPGA.

Step 104: The RDMA hardware part encapsulates the TCP header, the ip header, and the mac header regarding the payload data according to information delivered by the software.

Step 105: After encapsulated, the RDMA message is delivered to a hardware module for processing to detect whether the RDMA message conforms a first flow table in the hardware module; if the RDMA message conforms the first flow table in the hardware module, a processing operation is performed on the RDMA message according to the flow rule in the first flow table, for example, vxlan encapsulation is performed, a congestion control value in the inner layer is copied to the outer layer, a corresponding message identification bit is arranged on the outer layer vxlan to represent an RDMA message, and then the message is forwarded.

Specifically, the format of a first flow table/second flow table is as shown in Table 1 below. The first flow table includes two parts with the first part for inquiring flow keys of the flow table and extracted from a message, and the other part being flow action information and extracted from information regarding actions implemented after performing a conformity check of flow keys extracted from messages such as encapsulation/decapsulation of vxlan, from which port, the information is sent out.

TABLE 1

Flow table

| Flow ID | Flow key value | | | | | | Flow action information | |
|---|---|---|---|---|---|---|---|---|
| | Source port ip/sip | Destination ip/sip | Source port/sport | Destination port/dport | Vni/port_id | Flow dir | Action 1 | Action 2 |
| 1 | 192.168.0.1 | 192.168.0.2 | 1000 | 2000 | 1024 | in | Vxlan encap | Out port1 |
| 2 | 192.168.0.3 | 192.168.0.4 | 3000 | 4000 | 2048 | out | Vxlan decap | Out port4 |
| 3 | ... | ... | ... | ... | ... | ... | ... | ... |

When the flow table above is a first flow table, it may detect whether the RDMA message conforms the first flow table, that is, it is possible to detect whether the 5-tuple in the RDMA message conforms the first flow table. If it conforms the first flow table, the corresponding flow action information such as action 1 or action 2 in the first flow table will be implemented.

Step 106: If the RDMA message does not conform the first flow table in the hardware module, the RDMA message will be uploaded to the software vswitch for processing. The vswitch performs corresponding processing on the RDMA message, for example, encapsulation of vxlan is performed, a congestion control value in the inner layer is copied to the outer layer, a corresponding message identification bit is arranged on the outer layer vxlan to represent a RDMA message, and then the message is forwarded. The second flow table corresponding to RDMA is delivered downward and sent to the hardware module to be used as a first flow table.

It should be noted that the processed message at the receiving terminal is similar to the processed message above. If the RDMA flow rule in the first flow table in the hardware module is conformed, a processing operation on the RDMA message is performed according to the flow rule in the first flow table, for example, encapsulation of vxlan is performed, a congestion control value in the outer layer is copied to the inner layer, and a corresponding data sequence value is arranged. If the RDMA flow rule in the first flow table in the hardware module is not conformed, the message is uploaded to the software vswitch for processing; the software vswitch determines an RDMA message according to a message identification bit arranged on vxlan; a flow processing process of an RDMA message may be performed, for example, decapsulation of vxlan is performed, a congestion control value in the outer layer is copied to the inner layer, a corresponding data sequence value is arranged. The message is sent back to the hardware, and the corresponding RDMA flow is delivered downward to the hardware to be used as a first flow table.

In addition, after the hardware RDMA part completes parsing of the RDMA message, such as decapsulation of an ip header, a mac header, and a TCP header, and delivery of the mate information of the descriptor upward to the RDMA software part which updates connection management information of RDMA, and then sends the same back to the destination terminal to implement a data processing operation of the RDMA message.

The technical solution provided in the embodiment can implement a transmission operation of RDMA data on the basis of an overlay network structure. Besides, the technical solution can shield the implementation details of a physical network, and there is no restriction on the scope of the physical network, and there is no restriction on communication with subnets, it does not therefore rely on central control nodes and there is no bottleneck problem regarding the performance of a center node. Furthermore, in the technical solution, a solution where software and hardware of the network card are combined is used with the hardware part responsible for encapsulating/decapsulating a message and the software part responsible for focusing on state management, which balances the performance and flexibility of message processing. In addition, the RDMA data processing flow in the embodiment multiplexes the processing logic of the vswitch with normal VPC network traffic. For example, it may multiplex multiple functions, e.g., security groups, of normal VPC networks. Moreover, the technical solution is implemented by using a TCP based iwarp solution, which allows the use of native congestion control of TCP, with a high level of maturity, and is more adaptable to large-scale networks, thereby further improving the practicability of the technical solution.

Figure 11:
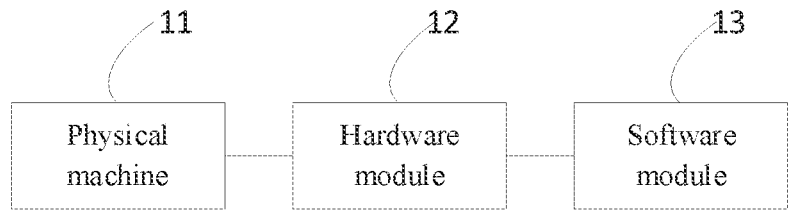
FIG. 11 is a schematic structural diagram of a data transmission apparatus based on Remote Direct Memory Access provided in an embodiment of the present invention.

FIG. 11 is a schematic structural diagram of a data transmission apparatus based on Remote Direct Memory Access provided in an application embodiment of the present invention. With reference to FIG. 11, the embodiment provides a data transmission apparatus based on Remote Direct Memory Access. The data transmission apparatus may implement the data transmission method based on Remote Direct Memory Access as shown in FIG. 3 above. Specifically, the data transmission apparatus may include: a physical machine 11, a hardware module 12, and a software module 13 communicatively connected to each other.

The physical machine 11 is used for generating payload data corresponding to an RDMA message to be forwarded.

The hardware module 12 is communicatively connected with the physical machine 11 for acquiring payload data corresponding to the RDMA message to be forwarded, and encapsulating of a message header of the payload data to obtain a processed message.

The hardware module 12/software module 13 is used for forwarding the processed message.

In some embodiments, when the hardware module 12/software module 13 forwards the processed message,
  the hardware module 12 is used for detecting whether the processed message conforms a first flow table, wherein the first flow table is stored in the hardware module 12; in the event that the processed message conforms the first flow table, the processed message is forwarded on the basis of the first flow table; in the event that the processed message does not conform the first flow table, the processed message is sent to the software module 13;

the software module 13 is used for receiving the processed message and forwarding the processed message on the basis of a second flow table, wherein the second flow table is stored in the software module 13.

In some embodiments, after the software module 13 forwards the processed message on the basis of a second flow table, the software module 13 in the embodiment is used for implementing: acquisition of a target flow table corresponding to the processed message; sending of the target flow table to the hardware module 12 for use as a first flow table.

In some embodiments, when the hardware module 12 encapsulates a message header of payload data to obtain a processed message, the hardware module 12 is used for implementing: acquisition of a data descriptor of the payload data with the data descriptor used for identifying the length and RDMA header information of the payload data; acquisition of encapsulation information corresponding to the payload data by using the data descriptor; encapsulation of the message header of the payload data by using the encapsulation information to obtain a processed message.

In some embodiments, when the hardware module 12 acquires encapsulation information corresponding to the payload data by using a data descriptor, the hardware module 12 is used for implementing: sending of the data descriptor to a software module 13.

The software module 13 is used for generating encapsulation information corresponding to the payload data by using a data descriptor, and sending the encapsulation information and the data descriptor to the hardware module 12.

In some embodiments, when the software module 13 generates encapsulation information corresponding to the payload data by using a data descriptor, the software module 13 is used for implementing: protocol stack processing and congestion control processing of the data descriptor, and generation of encapsulation information corresponding the payload data, wherein the encapsulation information includes: a congestion control value for identifying congestion control, Transmission Control Protocol (TCP) header information, Internet Protocol (IP) header information, and Medium Access Control (MAC) header information.

In some embodiments, when a hardware module 12 or software module 13 forwards a processed message, the hardware module 12 or software module 13 is used for implementing: VxLAN encapsulation on the processed message to obtain a target message; acquisition of a congestion control value corresponding to the target message; copying of the congestion control value to the outer layer and generation of a message format identifier corresponding to the target message in the outer layer with the message format identifier used for identifying the target message as an RDMA message; and forwarding of the target message on the basis of the congestion control value, the message format identifier, and a flow table forwarding rule.

In some embodiments, the physical machine 11, the hardware module 12, and the software module 13 in the embodiment are further used for implementing the following steps.

The physical machine 11 is used for generating a message to be forwarded and sending the message to be forwarded to a network card node.

The hardware module 21 is used for acquiring a message to be forwarded and performing a decapsulation operation on the message header of the message to be forwarded to obtain a decapsulated message corresponding to the message to be forwarded.

The hardware module 12/software module 13 is used for forwarding the decapsulated message.

In some embodiments, when a hardware module 12/software module 13 forwards a decapsulated message, the hardware module 12 is used for detecting whether the decapsulated message conforms a first flow table; in the event that the decapsulated message conforms the first flow table, the hardware module 12 is used for forwarding the decapsulated message on the basis of the first flow table; in the event that the decapsulated message does not conform the first flow table, the hardware module 12 sends the decapsulated message to the software module 13;

the software module 13 is used for acquiring a decapsulated message and forwarding the decapsulated message on the basis of a second flow table.

In some embodiments, when a hardware module 12 forwards a decapsulated message on the basis of a first flow table, the hardware module 12 is used for implementing: VxLAN decapsulation on a decapsulated message by using the first flow table to obtain a target message; acquisition of a congestion control value corresponding to the target message, and copying of the congestion control value to the inner layer; forwarding of the target message on the basis of the congestion control value and the first flow table.

In some embodiments, when a software module 13 forwards a decapsulated message by using a second flow table, the software module 13 is used for implementing: acquisition of a message format identifier corresponding to the decapsulated message by using a second flow table; VxLAN decapsulation on the decapsulated message on the basis of the second flow table to obtain a target message, in the event that the decapsulated message is determined as an RDMA message on the basis of a message format identifier; acquisition of a congestion control value corresponding to the target message, and copying of the congestion control value to the inner layer; and forwarding of the target message on the basis of the congestion control value and the second flow table.

In some embodiments, after the hardware module 12 performs a decapsulation operation on the message header of a message to be forwarded, the hardware module 12 and the software module 13 in the embodiment may further be used for implementing the following steps.

The hardware module 12 is used for acquiring a message descriptor corresponding to a message to be forwarded; and sending the decapsulated message and the message descriptor to the software module 13.

The software module 13 is used for updating connection management information for implementing an RDMA message transmission operation by using the decapsulated message and the message descriptor.

In some embodiments, after acquiring a target message, the software module 13 in the embodiment is used for implementing: generation and storage of a data sequence value corresponding to the target message with data sequence value related to encapsulation information for performing encapsulation processing on message data.

In some embodiments, before acquiring payload data corresponding to an RDMA message to be forwarded, the hardware module 12 and the software module 13 in the embodiments are used for implementing the following steps.

The hardware module 12 is used for acquiring build-connect payload data for implementing an RDMA build-connect operation.

The software module 13 is used for encapsulating a message header of build-connect payload data by using a virtual switch in the software module 13 to obtain a build-connect message; determining a build-connect flow table corresponding to the build-connect message by using a software manager in the software module 13, and sending the build-connect flow table to the virtual switch, which virtual switch forwards the build-connect message on the basis of the build-connect flow table to implement an RDMA build-connect operation.

In some embodiments, after the virtual switch forwards a build-connect message on the basis of a build-connect flow table, the software module 13 in the embodiments is used for sending, by using the virtual switch, the build-connect flow table to the hardware module 12 to be used as a first flow table.

The apparatus as shown in FIG. 11 may implement methods in the embodiments as shown in FIG. 2-FIG. 10. As for the parts not described in the embodiment in a detailed manner, reference can be made to relevant description of the embodiments as shown in FIG. 2-FIG. 10. As for the process and the technical effect of implementing the technical solution, reference can be made to the description in the embodiments as shown in FIG. 2-FIG. 10. No more details will be repeated here.

Figure 12:
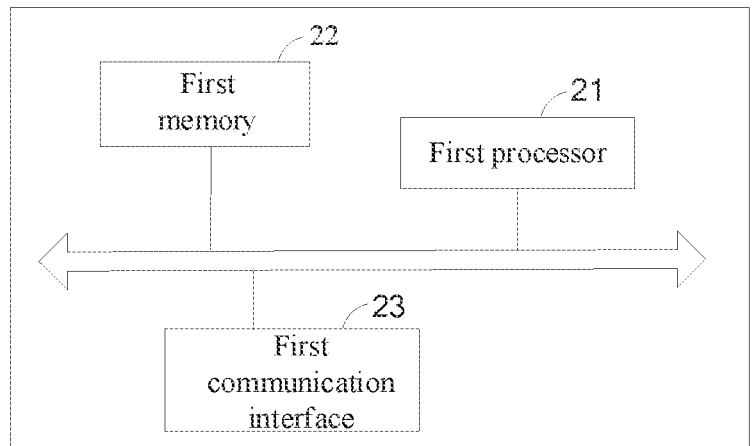
FIG. 12 is a schematic structural diagram of an electronic device corresponding to the data transmission apparatus provided in the embodiment as shown in FIG. 11.

In a possible design, the structure of the data transmission apparatus based on Remote Direct Memory Access as shown in FIG. 11 may be implemented as an electronic device which may be various devices such as a network card structure or a server. As shown in FIG. 12, the electronic device may include: a first processor 21 and a first memory 22, wherein the first memory 22 is used for storing a program for implementing a data transmission method based on Remote Direct Memory Access provided in the embodiments as shown in FIG. 2-FIG. 10 above, and the first processor 21 is configured to implement a program stored in the first memory 22.

The program includes one or more computer instructions, wherein the one or more computer instructions, when executed by the first processor 21, can implement the following steps:

acquiring payload data corresponding to an RDMA message to be forwarded;

encapsulating a message header of the payload data by using a hardware module in the network card node to obtain a processed message;

forwarding the processed message by using the hardware module or a software module in the network card node.

Further, the first processor 21 is further used for implementing all or some steps in the preceding embodiments as shown in FIG. 2-FIG. 10.

The structure of the electronic device may further include a first communication interface 23 for the electronic device to communicate with other devices or communication networks.

Figure 13:
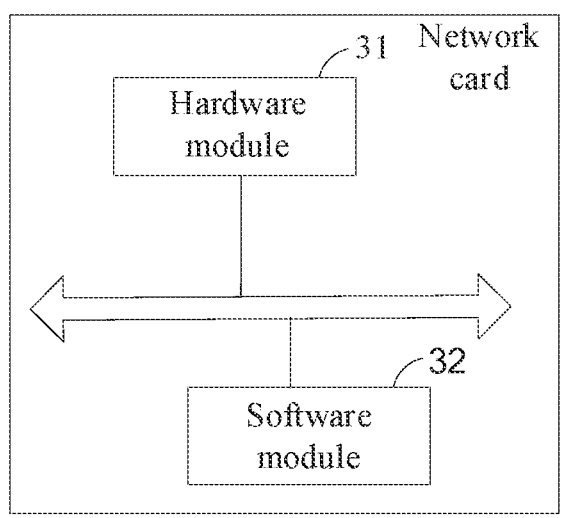
FIG. 13 is a schematic structural diagram of a network card provided in an embodiment of the present invention.

FIG. 13 is a schematic structural diagram of a network card provided in an embodiment of the present invention. With reference to FIG. 13, the embodiment provides a network card which may implement the data transmission method based on Remote Direct Memory Access as shown in FIG. 2 above. Specifically, the network card may include following modules.

A hardware module 31 for acquiring payload data corresponding to an RDMA message to be forwarded, and encapsulating a message header of the payload data to obtain a processed message.

A hardware module 31/software module 32 for forwarding the processed message.

The software module 32 may include a virtual switch (vswitch) responsible for a forwarding operation of normal VPC network traffic. Specifically, the software module 32 may acquire 5-tuple features of a message, inquires various forwarding tables such as routing table and ACL table by means of the 5-tuple features to obtain query results, and then generate a second flow table on the basis of the query results and the 5-tuple features. The hardware module 31 may use a Field Programmable Gate Array (hereinafter referred to as FPGA) or an Application Specific Integrated Circuit (hereinafter referred to as ASIC). The hardware module 31 may uninstall a second flow table delivered downward by the software vswitch.

The network card as shown in FIG. 13 may implement methods in the embodiments as shown in FIG. 2-FIG. 10. As for the parts not described in the embodiment in a detailed manner, reference can be made to relevant description in the embodiments as shown in FIG. 2-FIG. 10. As for the process and the technical effect of implementing the technical solution, reference can be made to the description in the embodiments as shown in FIG. 2-FIG. 10. No more details will be repeated here.

In addition, the embodiment of the present invention provides a computer storage medium for storing computer software instructions used by an electronic device including a program involved for implementing the data transmission methods based on Remote Direct Memory Access in the method embodiments as shown in FIG. 2-FIG. 10 above.

In addition, the embodiment of the present invention provides a computer program product, including a computer readable storage medium stored with a computer instruction. When the computer instruction is executed by one or more processors, the one or more processors execute the steps in the data transmission methods based on Remote Direct Memory Access in the methods embodiments as shown in FIG. 2-FIG. 10 above.

The apparatus embodiments described above are only schematic, wherein the units illustrated as separated components may be or may also not be physically separated, and the components shown as units may be or may also be physical units, that is, they may be located in one place or may also be distributed on multiple network units. Some or all of these modules may be selected in light of actual needs to implement the purpose of the solution in the embodiment, which could be understood and implemented by those skilled in the art without any creative efforts.

Through description of the embodiments above, it is clear to those skilled in the art that the respective embodiments may be implemented by means of adding a necessary general-purpose hardware platform, or by means of combining hardware with software. Based on such understanding, the technical solution above essentially, or the portion of it that contributes to the existing technology, may be imbodied in a form of a computer product. The present invention may use a form of computer program product implemented on one or more storage media available to computers (including but not limited to magnetic disk storages, CD-ROMs, optical memories and so forth) comprising program codes available to computers.

The present invention is described with reference to flow diagrams and/or block diagrams of the method, device (system), and computer program product in the embodiments of the present invention. It should be understood that each flow and/or block in the flow diagrams and/or block diagrams as well as a combination of a flow and/or block in the flow diagrams and/or block diagrams may be implemented by computer program instructions. These computer program instructions may be provided to general-purpose computers, special-purpose computers, embedded processors or processors of other programmable devices to generate a machine such that instructions executed by computers or processors of other programmable devices are generated for implementing an apparatus with functions designated in a flow or multiple flows in the flow diagrams and/or a block or multiple blocks in the block diagrams.

These computer program instructions may also be stored in computer-readable memory capable of directing a computer or other programmable device to operate in a particular manner, such that the instructions stored in that computer-readable memory produce an article of manufacture comprising an instructional device that implements a function specified in one or more processes of a flowchart and/or one or more blocks of a block diagram.

These computer program instructions may also be stored in computers or other programmable devices such that a series of operating steps are executed on the computers or other programmable devices to produce computer-implemented processing, such that the instructions executed on the computers or other programmable devices provide steps for implementing a function specified in one or more processes of a flowchart and/or one or more blocks of a block diagram.

In a typical configuration, a computing device includes one or more processors (CPU), an input/output interface, a network interface, and a memory.

The memory may include a volatile memory in computer readable media, a random-access memory (RAM) and/or non-volatile RAM, and other forms such as a read-only memory (ROM) or a flash memory (flash RAM). The memory is an example of computer readable media.

The computer readable media include permanent and non-permanent, removable and non-removable media that may implement information storage with any method or technology. The information may be computer readable instructions, data structures, modules of a program or other data. Examples of computer storage media include but not limited to a phase change random access memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, a compact disc read-only memory (CD-ROM), a digital versatile disc (DVD) or other optical storages, a magnetic cassette tape, a magnetic tape/disk storage or other magnetic storage devices or any other non-transmission media that may be used for storing information that is accessible to a computing device. According to the definition herein, the computer readable media do not include transitory computer readable media (transitory media) such as modulated data signals and carrier waves.

In the technical solution provided in the embodiments, a processed message is obtained by acquiring payload data corresponding to an RDMA message to be forwarded, and encapsulating a message header of the payload data by using a hardware module in a network card node, and then the processed message is forwarded by using a software module or hardware module in the network card node, which effectively implements a message processing operation in a software and hardware combination mode. Specifically, the hardware part may be responsible for the message encapsulation/decapsulation processing and the message fast forwarding operation; the software part may be responsible for a normal message forwarding operation, focusing on state management, thereby achieving an effective balance between the network performance and the flexibility of message processing, which is conducive to reducing the bandwidth and processor overhead requirements, while significantly reducing latency. In addition, the technical solution can realize application of the RDMA technology on the basis of an overlay network architecture, which can not only shield the implementation details of a physical network, and there is no restriction on the scope of the physical network, and there is no restriction on communication with subnets. In addition, the message forwarding method may multiplex the processing logic of a virtual switch with normal VPC network traffic, e.g., security groups and the like, further improving the flexibility and reliability of the use of the message forwarding method.

It should be noted that the embodiments above are only for illustrating the technical solutions of the present invention, not for limiting them. Although the present invention is described in a detailed manner with reference to the preceding embodiments, those skilled in the art should understand that it is possible to make modifications to the technical solutions disclosed in the foregoing embodiments, or conduct equivalent replacements of some technical features therein. These modifications or replacements do not make the essence of corresponding technical solutions depart from the spirt and principles of the technical solutions in respective embodiments in the present invention.

What is claimed is:

1. A message forwarding method based on Remote Direct Memory Access (RDMA), comprising:
   utilizing a memory and a processor, wherein the memory is used for storing one or more computer instructions, wherein the one or more computer instructions, when executed by the processor, implements operations of:
   acquiring payload data corresponding to an RDMA message to be forwarded;
   encapsulating a message header of the payload data by using a hardware module in a network card node to obtain a processed message;
   forwarding the processed message by using the hardware module or a software module in the network card node;
   wherein before acquiring the payload data corresponding to the RDMA message to be forwarded, the method further comprises:
   acquiring build-connect payload data for implementing an RDMA build-connect operation;
   encapsulating a message header of the build-connect payload data by using a virtual switch in the software module to obtain a build-connect message;
   determining a build-connect flow table corresponding to the build-connect message by using a software manager in the software module, and sending the build-connect flow table to the virtual switch; and
   performing, by the virtual switch, a forwarding operation on the build-connect message based on the build-connect flow table, to implement an RDMA build-connect operation.

2. The method according to claim 1, wherein forwarding the processed message by using the hardware module or the software module in the network card node, comprising:

detecting whether the processed message conforms a first flow table, wherein the first flow table is stored in the hardware module;

forwarding the processed message by using the hardware module and the first flow table in the event that the processed message conforms the first flow table;

forwarding the processed message by using the software module and a second flow table in the event that the processed message does not conform the first flow table, wherein the second flow table is stored in the software module.

3. The method according to claim 2, wherein after forwarding the processed message by using the software module and the second flow table, the method further comprises:

acquiring a target flow table corresponding to the processed message;

sending the target flow table to the hardware module for use as the first flow table.

4. The method according to claim 1, wherein encapsulating the message header of the payload data by using the hardware module in the network card node to obtain the processed message, comprising:

acquiring a data descriptor of the payload data by using the hardware module, the data descriptor being used to identify a length and RDMA header information of the payload data;

acquiring encapsulation information corresponding to the payload data by using the data descriptor;

encapsulating the message header of the payload data by using the hardware module and the encapsulation information to obtain the processed message.

5. The method according to claim 4, wherein acquiring the encapsulation information corresponding to the payload data by using the data descriptor, comprising:

sending the data descriptor to the software module by using the hardware module;

generating encapsulation information corresponding to the payload data by using the software module and the data descriptor, and sending the encapsulation information and the data descriptor to the hardware module.

6. The method according to claim 5, wherein generating the encapsulation information corresponding to the payload data by using the software module and the data descriptor, comprising:

performing protocol stack processing and congestion control processing on the data descriptor by using the software module to generate encapsulation information corresponding to the payload data, wherein the encapsulation information comprises: a congestion control value for identifying congestion control, Transmission Control Protocol TCP header information, Internet Protocol IP header information, and Medium Access Control MAC header information.

7. The method according to claim 2, wherein forwarding the processed message, comprising:

performing VxLAN encapsulation on the processed message to obtain a target message;

acquiring a congestion control value corresponding to the target message;

copying the congestion control value to an outer layer and generating, in the outer layer, a message format identifier corresponding to the target message, the message format identifier being used to identify the target message as the RDMA message;

forwarding the target message based on the congestion control value, the message format identifier, and a flow table forwarding rule.

8. The method according to claim 1, further comprising:

acquiring a message to be forwarded;

performing a decapsulation operation on a message header of the message to be forwarded by using the hardware module in the network card node to obtain a decapsulated message corresponding to the message to be forwarded;

forwarding the decapsulated message by using the hardware module or the software module.

9. The method according to claim 8, wherein forwarding the decapsulated message by using the hardware module or the software module, comprising:

detecting whether the decapsulated message conforms a first flow table;

forwarding the decapsulated message by using the hardware module and the first flow table in the event that the decapsulated message conforms the first flow table;

forwarding the decapsulated message by using the software module and a second flow table in the event that the decapsulated message does not conform the first flow table.

10. The method according to claim 9, wherein forwarding the decapsulated message by using the hardware module and the first flow table, comprising:

performing VxLAN decapsulation on the decapsulated message by using the hardware module and the first flow table to obtain a target message;

acquiring a congestion control value corresponding to the target message, and copying the congestion control value to an inner layer;

forwarding the target message based on the congestion control value and the first flow table.

11. The method according to claim 9, wherein forwarding the decapsulated message by using the software module and the second flow table, comprising:

acquiring a message format identifier corresponding to the decapsulated message by using the software module and the second flow table;

performing VxLAN decapsulation on the decapsulated message based on the second flow table to obtain a target message, in the event that the decapsulated message is determined as an RDMA message based on the message format identifier;

acquiring a congestion control value corresponding to the target message and copying the congestion control value to an inner layer;

forwarding the target message based on the congestion control value and the second flow table.

12. The method according to claim 9, wherein after performing the decapsulation operation on the message header of the message to be forwarded by using the hardware module in the network card node, the method further comprises:

acquiring a message descriptor corresponding to the message to be forwarded;

sending the decapsulated message and the message descriptor to the software module;

updating connection management information for implementing an RDMA message transmission operation by using the software module, the decapsulated message, and the message descriptor.

13. The method according to claim 10, wherein after acquiring the target message, the method further comprises:

generating and storing a data sequence value corresponding to the target message, the data sequence value being related to encapsulation information for performing encapsulation processing on message data.

14. The method according to claim 2, further comprising:
acquiring a message to be forwarded;
performing a decapsulation operation on a message header of the message to be forwarded by using the hardware module in the network card node to obtain a decapsulated message corresponding to the message to be forwarded;
forwarding the decapsulated message by using the hardware module or the software module.

15. The method according to claim 3, further comprising:
acquiring a message to be forwarded;
performing a decapsulation operation on a message header of the message to be forwarded by using the hardware module in the network card node to obtain a decapsulated message corresponding to the message to be forwarded;
forwarding the decapsulated message by using the hardware module or the software module.

16. A message forwarding apparatus based on Remote Direct Memory Access (RDMA), comprising:
a physical machine for generating payload data corresponding to an RDMA message to be forwarded;
a memory and a processor, wherein the memory is used for storing one or more computer instructions, wherein the one or more computer instructions, when executed by the processor, provide:
acquiring the payload data corresponding to the RDMA message to be forwarded, and encapsulating a message header of the payload data by using a hardware module to obtain a processed message;
forwarding the processed message by using the hardware module or a software module;
acquiring build-connect payload data for implementing an RDMA build-connect operation by using the hardware module, before acquiring the payload data corresponding to the RDMA message to be forwarded;
encapsulating a message header of the build-connect payload data by using a virtual switch in the software module to obtain a build-connect message, and determining a build-connect flow table corresponding to the build-connect message by using a software manager in the software module, and sending the build-connect flow table to the virtual switch;
performing, by the virtual switch, a forwarding operation on the build-connect message based on the build-connect flow table, to implement an RDMA build-connect operation.

17. An electronic device, comprising a memory and a processor, wherein the memory is used for storing one or more computer instructions, wherein the one or more computer instructions, when executed by the processor, implements operations of:
acquiring payload data corresponding to a Remote Direct Memory Access message to be forwarded;
encapsulating a message header of the payload data by using a hardware module in a network card node to obtain a processed message;
forwarding the processed message by using the hardware module or a software module in the network card node;
wherein before acquiring the payload data corresponding to the RDMA message to be forwarded, the one or more computer instructions, when executed by the processor, further implements operations of:
acquiring build-connect payload data for implementing an RDMA build-connect operation;
encapsulating a message header of the build-connect payload data by using a virtual switch in the software module to obtain a build-connect message;
determining a build-connect flow table corresponding to the build-connect message by using a software manager in the software module, and sending the build-connect flow table to the virtual switch;
performing, by the virtual switch, a forwarding operation on the build-connect message based on the build-connect flow table, to implement an RDMA build-connect operation.

18. A network card, comprising:
a memory and a processor, wherein the memory is used for storing one or more computer instructions, wherein the one or more computer instructions, when executed by the processor, provide:
acquiring payload data corresponding to an RDMA message to be forwarded, and encapsulating a message header of the payload data by using a hardware module to obtain a processed message;
forwarding the processed message by using the hardware module or a software module;
acquiring build-connect payload data for implementing an RDMA build-connect operation by using the hardware module, before acquiring the payload data corresponding to the RDMA message to be forwarded;
encapsulating a message header of the build-connect payload data by using a virtual switch in the software module to obtain a build-connect message, and determining a build-connect flow table corresponding to the build-connect message by using a software manager in the software module, and sending the build-connect flow table to the virtual switch;
performing, by the virtual switch, a forwarding operation on the build-connect message based on the build-connect flow table, to implement an RDMA build-connect operation.

19. A non-transitory computer storage medium for storing a computer program which, when executed, enables a computer to implement operations of:
acquiring payload data corresponding to a Remote Direct Memory Access message to be forwarded;
encapsulating a message header of the payload data by using a hardware module in a network card node to obtain a processed message;
forwarding the processed message by using the hardware module or a software module in the network card node;
wherein before acquiring the payload data corresponding to the RDMA message to be forwarded, the computer program, when executed, enables the computer to implement further operations of:
acquiring build-connect payload data for implementing an RDMA build-connect operation;
encapsulating a message header of the build-connect payload data by using a virtual switch in the software module to obtain a build-connect message;
determining a build-connect flow table corresponding to the build-connect message by using a software manager in the software module, and sending the build-connect flow table to the virtual switch;
performing, by the virtual switch, a forwarding operation on the build-connect message based on the build-connect flow table, to implement an RDMA build-connect operation.

* * * * *